US012625490B2

(12) United States Patent
Pack

(10) Patent No.: US 12,625,490 B2
(45) Date of Patent: May 12, 2026

(54) PROCESS NETWORK WITH SEVERAL PLANTS

(71) Applicant: BASF SE, Ludwigshafen am Rhein (DE)

(72) Inventor: Robert Pack, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 716 days.

(21) Appl. No.: 17/797,231

(22) PCT Filed: Feb. 5, 2021

(86) PCT No.: PCT/EP2021/052877
§ 371 (c)(1),
(2) Date: Aug. 3, 2022

(87) PCT Pub. No.: WO2021/156484
PCT Pub. Date: Aug. 12, 2021

(65) Prior Publication Data
US 2023/0053175 A1      Feb. 16, 2023

(30) Foreign Application Priority Data

Feb. 7, 2020      (EP) ..................................... 20156232

(51) Int. Cl.
G05B 19/418           (2006.01)
(52) U.S. Cl.
CPC .................. G05B 19/41885 (2013.01); G05B 19/4183 (2013.01); G05B 19/41865 (2013.01)
(58) Field of Classification Search
CPC ................ G05B 17/02; G05B 19/4183; G05B 19/41865; G05B 19/41885; Y02P 90/02
See application file for complete search history.

(56) References Cited

U.S. PATENT DOCUMENTS 4,766,550 A * 8/1988 Byers ................... G21C 17/022
                                                        422/62
9,607,422 B1 * 3/2017 Leedom .................. G06F 30/23
(Continued)

FOREIGN PATENT DOCUMENTS

WO    WO-2018/009546 A1    1/2018
WO       2019220128 A1    11/2019

OTHER PUBLICATIONS

European Search Report for EP Patent Application No. 20156232.9, Issued on Nov. 23, 2020, 5 pages.
(Continued)

*Primary Examiner* — Scott T Baderman
*Assistant Examiner* — Mario M Velez-Lopez
(74) *Attorney, Agent, or Firm* — Lowenstein Sandler LLP

(57)           ABSTRACT

A computer implemented method for generating a problem specific representation of a process network to enable controlling or monitoring a process network with at least two interconnected chemical plants, the method comprising the steps of providing a first digital representation of the process network comprising a digital process representation of each plant, its connections to other plants and sensor elements placed in the process network, generating based on the first digital representation a graph structure including vertices representing unit operations, edges linking unit operations representing at least physico-chemical quantities, wherein the edges include edge meta data representing at least physico-chemical quantities, and a measurable tag, generating based on the graph structure a collapsed graph structure including, vertices representing virtual unit operations, edges linking virtual unit operations representing at least physico-chemical quantities, wherein the edges include edge meta data representing observable physico chemical quantities, and their relation to vertices, deriving a set of balance equations from the collapsed graph structure, providing the
(Continued)

Figure 1:
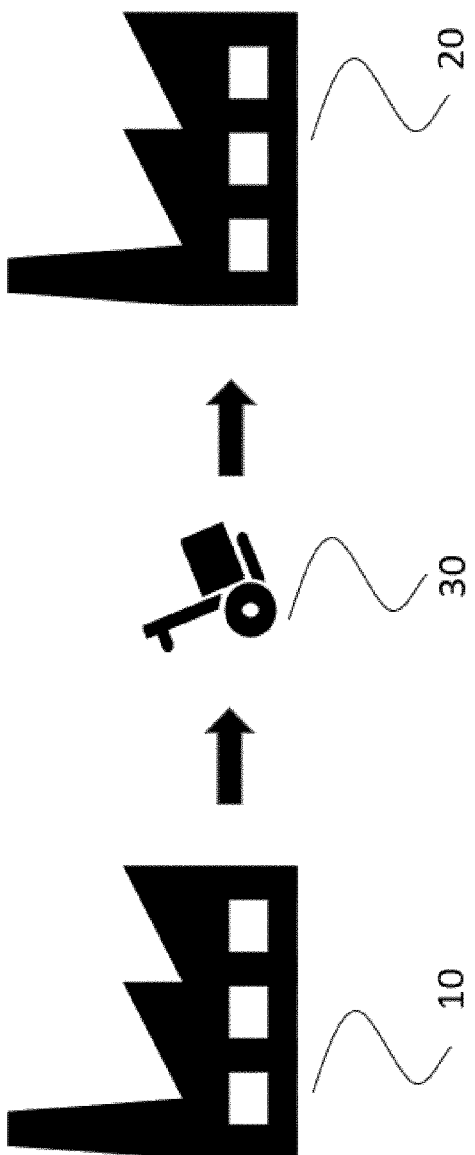

set of balance equations, and physico- chemical quantities for monitoring and/or controlling operation of a process network is proposed.

12 Claims, 10 Drawing Sheets

(56) References Cited

U.S. PATENT DOCUMENTS

| | | | | |
|---|---|---|---|---|
| 10,437,210 | B2 * | 10/2019 | Boys | G05B 17/02 |
| 10,990,067 | B2 * | 4/2021 | Modi | G05B 13/048 |
| 12,067,711 | B2 * | 8/2024 | Humpston | G06V 10/62 |
| 2003/0028268 | A1 * | 2/2003 | Eryurek | G05B 23/0267 |
| | | | | 700/74 |
| 2005/0007249 | A1 * | 1/2005 | Eryurek | G05B 23/027 |
| | | | | 340/511 |
| 2013/0222388 | A1 | 8/2013 | Mcdonald | |
| 2014/0297230 | A1 * | 10/2014 | Grimm | G06Q 10/067 |
| | | | | 703/1 |
| 2015/0106068 | A1 * | 4/2015 | Boys | G05B 17/02 |
| | | | | 703/2 |
| 2016/0146493 | A1 | 5/2016 | Ettl | |
| 2016/0306332 | A1 | 10/2016 | Hill | |
| 2018/0189389 | A1 * | 7/2018 | Baldini Soares | G06F 16/367 |
| 2018/0314232 | A1 * | 11/2018 | Srinivasan | G05B 23/0289 |
| 2018/0330028 | A1 * | 11/2018 | Nutt | G06F 16/83 |
| 2019/0279422 | A1 * | 9/2019 | Hemmer | G06T 9/001 |
| 2023/0053175 | A1 * | 2/2023 | Pack | G05B 19/4183 |

OTHER PUBLICATIONS

Ferrada, et al., "Applications of neural networks in chemical engineering: Hybrid systems", Aiche Meeting, Nov. 1990, pp. 1-21.
Heinz A Preisig, "A Topology Approach to Modelling", Proceedings of SIMS 2004, Sep. 22-23, 2004, pp. 413-420.
Heinz A. Preisig, "A graph-theory-based approach to the analysis of large-scale plants", Computers & Chemical Engineering, vol. 33, Issue 3, Mar. 20, 2009, pp. 598-604.
Heo, et al., "Graph reduction for hierarchical control of energy integrated process networks", 2012 51st IEEE Conference on Decision and Control (CDC), Dec. 10-13, 2012, pp. 6388-6393.
International Search Report for PCT Patent Application No. PCT/EP2021/052877, Issued on Sep. 7, 2021, 5 pages.
Kretsovalis, et al., "Observability and redundancy classification in generalized process networks—I. Theorems", Computers & Chemical Engineering, vol. 12, Issue 7, Jul. 1988, pp. 671-687.
Kretsovalis, et al., "Observability and redundancy classification in generalized process networks—II. Algorithms", Computers & Chemical Engineering, vol. 12, Issue 7, Jul. 1988, pp. 689-703.
Lee, et al., "Parallel hybrid modeling methods for a full-scale cokes wastewater treatment plant", Journal of Biotechnology, vol. 115, Issue 3, Feb. 2005, pp. 317-328.
Levente L. Simon, "Continuous manufacturing: Is the process mean stationary?", Aiche Journal, vol. 64, Issue 7, Jul. 2018, pp. 2426-2437.
Mccabe, et al., Unit Operations of Chemical Engineering, 7th Edition, McGraw Hill Chemical Engineering Series, 2004, pp. 3-30.
Nocedal, et al., "Chapter: 12 Theory of Constrained Optimization", Numerical Optimization, 1999, pp. 305-354.
Partial European Search Report for EP Patent Application No. 20156232.9, Issued on Jul. 29, 2020, 6 pages.
Restrepo, et al., "The analysis of chemical engineering process plants and their models represented by networks", Chemical Engineering Transactions, vol. 70, 2018, pp. 79-84.
Thompson, et al., "Modeling chemical processes using prior knowledge and neural networks", Aiche Journal, vol. 40, Issue 8, Aug. 1994, pp. 1328-1340.
Yuan, et al., "B ayesian method for simultaneous gross error detection and data reconciliation", AIChE Journal, vol. 61, Issue 10, May 8, 2015, pp. 3232-3248.
International Search Report and Written Opinion for PCT Patent Application No. PCT/EP2021/052877, Issued on Jul. 28, 2022, 21 pages.

* cited by examiner

Reaction
streams ------->

Coolant -----

PROCESS NETWORK WITH SEVERAL PLANTS

CROSS-REFERENCE TO RELATED APPLICATION(S)

The present application is a national stage entry under 35 U.S.C. § 371 of International Application No. PCT/EP2021/052877, filed on Feb. 5, 2021, which claims priority to European Patent Application No. 20156232.9, filed on Feb. 7, 2020, the contents of which are hereby incorporated by reference in their entirety.

FIELD

The invention relates to a system and a computer implemented method for generating a problem specific representation of a process network to enable monitoring and or controlling a process network with at least two plants. The system further relates to use cases of the problem specific representation.

BACKGROUND

Chemical production is a highly complex environment. Especially, when two or more production plants are involved. Chemical plants typically include multiple assets to produce the chemical product. Multiple feeds of pure components or mixtures are present and at various stages energy is provided or withdrawn. Multiple sensors are distributed in such plants for monitoring and control purposes and collect data. As such, chemical production is a data heavy environment. However, to date monitoring and controlling interconnected plants is challenging.

In process engineering flowsheet simulators include graph structures to simulate chemical plants. Models in such flowsheet simulators are typically built to solve a given problem and cannot be transferred to other problems easily. Specifically, such simulators are static and cannot be easily adjusted. Additionally, the model design is cumbersome and time consuming. Specifically, each block/node used in a flowsheet model hast a largely fixed, though potentially parametrized, number of unknowns, and thus requires a specific number of specifications or additional con-straints/equations.

Using graph theory for describing a single plant were proposed by Preisig (Copmuter and Chem-ical Engineering, 33 (2009), 598-604).

Preisig et al. SIMS 2004, Copenhagen, Denmark, 23-24 Sep. 2004, pp 413-420 and Computers and Chemical Engineering 33 (2009) 598-604 describe a modeler is built on implementing a physical view of the world. It constructs an abstract process representation in form of a topology with two levels of refinements. First a physical view of the space occupied by the process and its relevant environment is defined, which is the physical topology. The first refinement is seen as a coloring of the topology by adding the species that are present in the plant. Finally, the second refinement adds the variables and equations describing the behavior of the individual components of the topology. The modeler described by Preisig aims to guarantee structurally solvable simulation problems, namely differential algebraic equations of index 1. The modeler allows to generate models for problems, including dynamic simulation, optimization and control design. Nevertheless, building the physical topology of the process is not an automatic process but a design process, which requires an in-depth understanding of the process being modelled.

McCabe et al. describe the concept of unit operations in chemical engineering ("unit operations of chemical engineering", McGraw Hill, October 2004, 7th edition)

Existing modelers are static and generate a set of equations that are tailored to the user specified problem. These models are not dynamic in the sense that they are automatically adaptable to e.g. different optimization problems. Additionally, interdependencies between process components or multiple plants are difficult to capture and lead to less robust results.

The object of the present invention relates to a system and a method for generating a problem specific representation of two or more interconnected plants to enable controlling or a process network with at least two plants. The system further relates to use cases of the problem specific representation.

SUMMARY

The proposed solution provides a more flexible approach for process simulation. Specifically, the processes are mapped and prepared in such a way that the model or optimization can be easily customized to the specific needs of a process user. Additionally, accuracy is enhanced by combining classical balance-equation based models with data-driven models that capture e.g. environmental effects not represented in rigorous models based on the laws of physics.

The proposed solution is particularly suited for monitoring, planning or controlling processes in plant networks, such as chemical production parks including downstream and upstream plants, energy generation complexes including or refineries. It allows for a more flexible approach to generate network models and to adapt the network model depending on present conditions. For example, if one plant in the network fails the network model can be adapted accordingly and still provide accurate predictions for monitoring or even controlling the plant network.

A computer implemented method for generating a model representation of a process network with at least two interconnected chemical plants to enable controlling or monitoring the process network is proposed, the method comprising the steps of:

providing a digital representation of the process network comprising
   a digital process representation of each plant,
   its connections to other plants (realized by mass or energy flow in the description) and sensor elements placed in the process network,
generating based on the first digital representation a graph structure including
   vertices representing unit operations,
   edges representing physico chemical quantities, wherein the physico chemical quantities comprise mass-, energy- and component flows, the edges linking vertices, wherein the edges include a measurable tag for each of the represented physico chemical quantities, the measurable tag indicating if the physico chemical quantity may be measured in the process network, or if the physico chemical quantity may not be measured;
categorizing the physico chemical quantities that may be measured in the process network as observable physico-chemical quantities, categorizing physico chemical quantities that may be calculated from balance equations around vertices as observable physico-chemical quantities, generating based on the graph structure a collapsed graph structure by collapsing edges with unobservable physico chemical quantities into collapsed vertices the collapsed graph structure including, collapsed vertices representing virtual unit operations, vertices representing unit operations edges representing only observable physico chemical quantities, linking collapsed vertices and/or vertices, deriving a set of balance equations for each mass-, energy- or component flow around each vertex, the set of balance equations modeling the plant network, the set of balance equations being usable for monitoring, controlling, production planning, prediction models, providing the set of balance equations, to a control device, a monitoring, a production planning device and or a prediction model generator.

A process network may be understood as a network of at least two chemical plants. A chemical plant is a plant in which at least one chemical reaction occurs.

The at least two plants may be interconnected. This interconnection may be realized by energy exchange from one plant to another, by mass transport from one plant to another, and in rare cases, the exchange of information between plants or their control systems, captured via expressions. The process network may be located on one site. The process network may alternatively be located across at least two sites, each site containing one or more interconnected chemical plants.

The digital process representation of each plant may be a Piping and instrumentation diagram (P&ID) representation of the plant or derived from the P&ID.

The digital representation of the process network may further comprise kind and location of offline measurements drawn from the process, known correlations between online and or offline data and other variables in the graph—i.e. expressions/models.

The digital representation may also comprise signals, which may come in three main realizations:

online signals may be provided by sensors installed directly in the plant

The digital representation may also comprise offline signals, e.g. laboratory data, and expert knowledge. Laboratory data may for example relate to concentrations, which were determined offline in a lab.

The digital representation may also comprise expressions. Expressions are relations that link one or more signals to another physical quantity.

The digital representation may also comprise models. Models may be available via APIs and may link any number of available signals, to any number of new signals which may relate to physical quantities.

In more detail the first digital representation of the process network may include smart piping and instrumentation diagrams for each plant including plant components, component characteristics like physical dimensions and layout, operation conditions like operation parameters, total mass flow connections between plant components, sensor components including location and measurement quantities, as well as chemical data relating to chemical properties, e.g. molecular weight and reactions for each plant, expert knowledge on thermodynamics, or reduced thermo-dynamic relations—like a known split of components in a liquid-liquid separator.

Unit operations may represent columns, reactors, pumps, heat exchangers, cristallers, and other known pieces of equipment that may be installed in a plant. Unit operations may further comprise transports, transports define connections between plants, transports may comprise (pipes, ships, trucks, trains, for lifts, or any means moving matter between unit operations). A model reflecting the process step of a specific unit operation may be reflected in the correspondent vertex. This model may be a rigorous model, a simple function or a data driven model or a hybrid model. These models may require physical quantities linked to the respective unit operation as input parameters. In particular chemical reactions may occur in unit operations and the chemical reaction may be modeled. More particular, a process network of two connected chemical plants may comprise at least one unit operation where a reaction occurs, the corresponding vertex may comprise a model transforming physico chemical quantities from one connected edge to physico chemical quantities on another connected edge.

The Vertices may further represent vertices meta data, comprising physical quantities linked to the respective unit operation e.g. volume, diameter, or data to internals—e.g. count and shape of pipes in a multi-tube reactor.

By providing vertices that represent vertices meta data comprising physical quantities linked to the respective unit operation the input parameters for the models related to the process step of the respective unit operation are provided in a very efficient way. Access is accelerated, because the graph structure is self-containing, such that it contains that relevant information. Accelerated access leads to a faster execution of the method steps, which in turn allows the set of balance equations to be provided faster. This leads to a reduced time for generating a model of the process network. This also reduces time in monitoring and/or controlling. A short lag time is crucial for monitoring and/or controlling a process network with at least two interconnected plants.

In the graph structure edges are linking unit operations. The edges may represent at least physico chemical quantities. Representing at least physico chemical quantities may comprise flow of conserved physico chemical quantities in and out of unit operations. Conserved physico chemical quantities are physico chemical quantities are physico chemical quantities following a conservation law. Another term may be conservation quantities. Physico-chemical quantities may also comprise variables as well as constraints. Conserved quantities may relate to quantities that are conserved in a self-contained system. These may be physical conserved quantities like e.g. total mass flow, energy flows and component flows. Conserved quantities may relate to quantities where conservation can be derived from physical laws. Furthermore, constitutive equations relate conserved quantities and the knowledge that along an edge these quantities are not changed, e.g. the sum of concentrations equals one. Consequently, the edges may further comprise constitutive laws.

A component flow relates to the mass flow of a certain component in a process network. For example, when a reaction including two components x and y results in a new component z, the total mass flow into a reactor is mass_total=mass_x+mass_y, while component flow for x is mass_x.

The total mass flow may be for example understood as the sum of all component flows. Edge metadata may also be comprised on each edge. Edge metadata may comprise physico-chemical quantities and may be provided as signals. Physico-chemical quantities may further comprise physico-chemical quantities required to fully describe a conserved physico chemical quantity. Physico-chemical quantities may comprise temperature, pressure, weight, mass, energy, concentrations, concentrations, activity.

A measurable tag may be provided to each physico-chemical quantity on edges, when the physico-chemical quantity may be measured in the process network by a sensor, the tag may be "measured", when the physico-chemical quantity may not measured, no tag may be associated or a tag "un-known" may be associated. Measured physico-chemical quantities may be provided directly from a sensor signal or may be derived from a sensor signal by expert knowledge or an expression. The physico-chemical quantity may be provided offline or online. In other words, measured means that the physico-chemical quantity, will be available in the process network either from inline measurements as data from a sensor, offline data, e.g. lab data, expert knowledge or an expression.

An expression may be a simple mathematical relation between online or offline data and a physico chemical quantity e.g. unit conversion.

A physico-chemical quantity may be considered observable, when the selected physi-cochemical quantity may be measured in the process network, may be calculated from balance equations around a vertex or may be measured and calculated. A physical quantity is considered calculated if the value can be derived from other measured physico-chemical quantities by laws of physics. Balance equations are based on conservation laws of the respective physico chemical quantity Generating based on the on the graph structure a collapsed graph structure, vertices representing virtual unit operations, edges linking virtual unit operations representing at least physico-chemical quantities, wherein the edges include edge meta data representing observable physico chemical quantities, and their relation to vertices, ensures that all remaining physico chemical quantities in the graph structure are observable. Observability is essential for deriving a set of balance equations that is solvable. The relation to vertices can be understood that the physico-chemical quantity is an output parameter of one vertex and an input parameter of the next vertex.

Generating based on the on the graph structure a collapsed graph structure, with only observable physico-chemical quantities on edges and their relation to the vertices, may comprise the step of generating new vertices, these are collapsed vertices representing virtual unit operations and may comprise several unit operations, wherein the all selected physical quantities connected to that vertex are observable. This new vertex may then be understood as a virtual unit operation. A new model reflecting the process step of that new virtual unit operation may be generated and reflected in the correspondent vertex. This model may be a rigorous model, a simple function or a data driven model or a hybrid model. These models may require physical quantities linked to the respective unit operation as input parameters. In a figurative way these collapsed vertices are generated by combining unit removing edges with unobservable physico-chemical quantities and collapsing the corresponding vertices into one collapsed vertex. This may be repeated until only Now, a set of balance equations derived from the graph structure is solvable and as such the graph structure allows to extract balance equations for any specific problem. This greatly reduces complexity of the digital representation. This reduced representation is problem specific, because the collapsed graph only contains problem specific physico-chemical quantities. This enables controlling or monitoring a process network with at least two interconnected chemical plants. Without reduction to a set of balance equations that fully describe the plant network and providing these equations and physico-chemical quantities controlling and monitoring would not be possible. Computation times are greatly reduced, because only balance equations need to be solved. This further allows to describe the complex plant network in a digestible way, such that prediction and production planning is enabled.

Physical Quantities that can be Measured and Determined may be Labeled Redundant It may be beneficial to define expressions on the level of the first digital representations. This increases the amount of physico-chemical quantities that can be labeled as measured. This increases the speed for generating the collapsed graph. This then allows the set of balance equations and physico-chemical quantities to be faster provided. This leads to a reduced lag time in monitoring and/or controlling. A short lag time is crucial for monitoring and/or controlling a pro-cess network with at least two interconnected plants.

The step generating based on the first digital representation a graph structure may further comprise generating a converged graph structure, by attributing labels to all physico-selected chemical quantities dependent on whether they are measured physico-chemical quantities, determined physico-chemical quantities, are measured and deter-mined physico-chemical quantities or physico-chemical quantities that are neither measured physico-chemical quantities nor determined physico-chemical quantities. The latter may be labeled unobservable.

Physical quantities that can be determined and measured may be labeled redundant. Providing such a label allows consistency checks.

When a physico-chemical quantity is redundant, the measured physico-chemical quantities can be compared with the determined physico-chemical quantity. Comparing measured physico-chemical quantity with the respective determined select-ed physico-chemical quantity may be described as consistency check.

Consistency is only confirmed, when both physico-chemical quantities are identical. Identical means that they are identical within error margins or when the residual between the respective selected pyhsico-chemical quantities is below a threshold or when the residual be-tween the respective selective quantities only shows random noise.

The labels may be provided as attributes to the collapsed graph structure. Providing these labels at the level of the collapsed graph is a very efficient way to provide the information. This accelerates accessibility of the labeled information. Accelerated access leads to a faster execution of the method steps, which in turn allows the set of balance equations and physico-chemical quantities to be faster provided. This leads to a reduced lag time in monitoring and/or controlling. A short lag time is crucial for monitoring and/or controlling a process network with at least two interconnected plants.

The labels may be provided to the set of balance equations. Providing these labels to the set of balance equations further accelerates accessibility of the information. Accelerated access leads to a faster execution of the method steps, which in turn allows the set of balance equations to be faster provided. This leads to a reduced lag time in monitoring and/or controlling. A short lag time is crucial for monitoring and/or controlling a process network with at least two interconnected plants. Essentially, the information does not need to be looked up in a separate database. Nowa-days databases are often in a cloud environment, this makes access slow compared to on site retrieval of the data.

For the purpose of labeling, observability and redundancy analysis may be performed. Redundancy and Observability analysis may be performed by applying the algorithms disclosed in Kretsovalis et al. (Comput. Chem. Engng, Vol 12, No 7, pp 671-687, and 689-703, 1988).

The step of generating the converged graph may comprise defining expressions between physico-chemical quantities, which may be stored in the graph. Storing expressions in the graph reduces the time for retrieving information from the converged graph.

The step generating based on the graph structure a collapsed graph structure collapsed graph structure may be preceded by collapsing edges comprising unobservable physico-chemical quantities into vertices. By collapsing the graph structure new vertices may be generated. These new vertices relate to unit operations that no longer need to reflect unit operations derived from the first digital representation. Virtual unit operations may be unit operations that no longer need to reflect unit operations derived from the first digital representation or reflect unit operations derived from the first digital representation.

This leads to a graph, where all conserved quantities can be derived based on measured selected physical properties. The collapsed graph represents the maximum information available form all known data. It may be further collapsed to reduce complexity of any set of balance equations that can be derived, while still guaranteeing structural solvability of the derived system. This greatly reduces complexity of the digital representation. This reduced representation is problem specific, because the collapsed graph only contains problem specific physico-chemical quantities. This enables controlling or monitoring a process network with at least two interconnected chemical plants. Without reduction to a set of balance equations that fully describe the plant network and providing these equations controlling and monitoring would not be possible. Computation times are greatly reduced because only balance equations need to be solved. This further allows to describe the complex plant network in a digestible way, such that prediction and production planning is enabled.

Generating a collapsed graph structure may comprise generating a collapsed graph structure for each conserved quantity, e.g. a collapsed graph structure for total mass flow and a separate collapsed graph structure for energy flow. This may be required if the observables for each conserved quantity are not on identical edges. Generating a collapsed graph structure for each conserved quantity conserves the largest possible information in the graph. For controlling and/or monitoring maintaining the largest possible information is beneficial.

The system of balance equations may be stored in the graph or may be stored in a separate database.

This has the advantage that a new system of balance equations does not need to be generated every time a request for monitoring and/or controlling the plant network is provided.

The step generating based on the graph structure a collapsed graph structure collapsed graph structure may be preceded by collapsing edges comprising unobservable physico-chemical quantities into vertices may be followed by, based on an objective, further collapsing edges with observable physico-chemical quantities into vertices.

For certain specific problems a reduced set of information is sufficient. These specific problems may be defined as an objective based on this objective the graph may be further collapsed.

Collapsing may be performed by aggregation of vertices and edges into a new collapsed vertex. This new collapsed vertex may then be understood as a new collapsed unit operation. A new collapsed model reflecting the process step of that new a specific unit operation may be generated and reflected in the correspondent collapsed vertex. This model may be a rigorous model, a simple function or a data driven model or a hybrid model. These models may require physical quantities linked to the respective unit operation as input parameters.

By further collapsing unnecessary information is removed. This results in a less complex graph. Consequently, the set of balance equations is also less complex although sufficient for that specific problem.

Therefore, the provided set of balance equations for monitoring and or controlling is faster to solve. This leads to a reduced lag time in monitoring and/or controlling. A short lag time is crucial for monitoring and/or controlling a process network with at least two interconnected plants. Such a specific problem may occur, when the edges between two vertices are not relevant for the controlling and/or monitoring and only the balance equations of the inflow into a first vertex and the outflow of a second vertex is relevant.

The method step of generating a converged graph structure may further comprise receiving a trigger signal, wherein the method step of generating a converged graph structure is initiated up-on evaluation of the trigger signal.

The trigger signal may be provided by a watchdog device. The watchdog device may monitor the process network for detecting changes in the process network. Upon detection of changes in the process network, generating a converged graph structure may be initiated.

Changes in the process network may result in changes to the observability of physico-chemical quantities some observables may become unobservable, which in turn would lead to an equation system that would no longer be solvable. Hence, monitoring and/or controlling would no longer be enabled.

By receiving a trigger signal, wherein the method step of generating a converged graph structure is initiated upon evaluation of the trigger signal these changes will be reflected in the step of generating the converged graph structure by attributing labels to all physico-chemical quantities dependent on whether they are measured physico-chemical quantities, deter-mined physico-chemical quantities, are measured and determined physico-chemical quantities or physico-chemical quantities that are neither measured physico-chemical quantities nor determined physico-chemical quantities.

The change in the observability of physico-chemical quantities will then be reflected in the generated collapsed graph structure. The step of deriving a set of balance equations from the collapsed graph structure will also reflect the changes in the process network. Such that the changes in the process network will also be reflected in the provided set of balance equations.

This dynamic approach leads to a more robust method for generating a problem specific representation to enable controlling or monitoring a process network with at least two interconnected chemical plants.

These changes in the process network may be sensor failures, or other errors.

The first aspect is also reflected in the following clauses:

1. A computer implemented method for generating a model representation of a process network with at least two interconnected chemical plants to enable controlling or monitoring the process network, the method comprising the steps of:

providing a digital representation of the process network comprising a digital process representation of each plant, its connections to other plants (realized by mass or energy flow in the description) and sensor elements placed in the process network, generating based on the first digital representation a graph structure including vertices representing unit operations, edges representing physico chemical quantities, wherein the physico chemical quantities comprise mass-, energy- and component flows, the edges linking vertices, wherein the edges include a measurable tag for each of the represented physico chemical quantities, the measurable tag indicating if the physico chemical quantity may be measured in the process network, or if the physico chemical quantity may not be measured;

categorizing the physico chemical quantities that may be measured in the process network as observable physico-chemical quantities, categorizing physico chemical quantities that may be calculated from balance equations around vertices as observable physico-chemical quantities, generating based on the graph structure a collapsed graph structure by collapsing edges with physico chemical quantities that are not categorized as observable into collapsed vertices, the collapsed graph structure including, collapsed vertices representing virtual unit operations, vertices representing unit operations edges representing only observable physico chemical quantities, linking collapsed vertices and/or vertices, deriving a set of balance equations for each mass-, energy- or component flow around each vertex, the set of balance equations modeling the plant network, the set of balance equations being usable for monitoring, controlling, production planning, prediction models, providing the set of balance equations, to a control device, a monitoring, a production planner device and or a prediction model generator.

2. Method according to clause 1, wherein the vertices further represent vertex meta data, comprising physical quantities linked to the respective unit operation.

3. Method according to any preceding clauses, wherein generating a collapsed graph structure comprises generating a collapsed graph for each physico-chemical quantity.

4. Method according to clause 3, wherein providing a set of balance equations from the collapsed graph structure comprises providing a set of balance equation for each con-served quantity 5. The method according to any of the preceding clauses, wherein the step of collapsing edges is followed by selecting at least two vertices that are connected via edges collapsing edges between the at least two vertices, thereby creating a virtual vertex.

6. Method according to any of the preceding clauses wherein the step generating based on the first digital representation a graph structure further comprises generating a converged graph structure by attributing labels to all physico- chemical quantities dependent on whether they are measured physico-chemical quantities, deter-mined physico-chemical quantities, are measured and determined physico-chemical quantities or physico-chemical quantities that are neither measured physico-chemical quantities nor determined physico-chemical quantities.

7. Method according to clause 7, further comprising receiving a trigger signal, wherein the method step of generating a converged graph structure is initiated upon evaluation of the trigger signal the trigger signal indicating that.

8. A system for generating a problem specific representation of a process network to enable controlling or monitoring a process network with at least two interconnected chemical plants, the system comprising a processor configured for performing the method steps according to any of the clauses 1-7, an output interface for providing the set of balance equations for monitoring and/or controlling operation of a pro-cess network.

9. Computer program product that when run on a computer performs the method steps of any of the method clauses 1-7.

10. A modeling system for generating a model representation of a process network with at least two interconnected chemical plants to enable controlling or monitoring the process network, the method comprising a processor and a communication interface, the processor configured to perform the steps of:

providing via a communication interface to the processor a digital representation of the process network comprising a digital process representation of each plant, its connections to other plants (realized by mass or energy flow in the description) and sensor elements placed in the process network, generating at the processor based on the first digital representation a graph structure including vertices representing unit operations, edges representing physico chemical quantities, wherein the physico chemical quantities comprise mass-, energy- and component flows, the edges linking vertices, wherein the edges include a measurable tag for each of the represented physico chemical quantities, the measurable tag indicating if the physico chemical quantity may be measured in the process network, or if the physico chemical quantity may not be measured;

categorizing with the processor the physico chemical quantities that may be measured in the process network as observable physico-chemical quantities, categorizing with the processor physico chemical quantities that may be calculated from balance equations around vertices as observable physico-chemical quantities, generating with the processor based on the graph structure a collapsed graph structure by collapsing edges with physico chemical quantities that are not categorized as observable into collapsed vertices, the collapsed graph structure including, collapsed vertices representing virtual unit operations, vertices representing unit operations edges representing only observable physico chemical quantities, linking collapsed vertices and/or vertices, deriving with the processor a set of balance equations for each mass-, energy- or component flow around each vertex, the set of balance equations modeling the plant network, the set of balance equations being usable for monitoring, controlling, production planning, prediction models, providing via the communication interface the set of balance equations, to a control device, a monitoring, a production planner device and or a prediction model generator.

In a second aspect a method for monitoring a process network with at least two plants is proposed, the method comprising the steps of:

receiving a request for at least one process network operation parameter, via an input interface retrieving via the input interface a system of balance equations from a collapsed graph structure of the process network, retrieving historical data related to measured physico-chemical quantities and metadata related to the at least one process network operation parameter from a database, receiving current data related to observable physico-chemical quantities and metadata for observable physico-chemical quantities, determining a value for the at least one process network operation parameter by solving the system of balance equations based on the historical data and the current data, providing via an output interface the value of the for at least one process network operation parameter.

The system of balance equations from a collapsed graph structure of the process network derived by the method of any of clauses 1 to 7 from the first aspect An input interface may be a physical interface (e.g. a keyboard, a mouse, a touch screen, a touch pad) or a non-physical interface (e.g. function call, API) it may also be a combination of physical and non-physical interfaces.

An output interface may be a physical interface (e.g. screen, a monitor) or a non-physical interface (e.g. function call, API) it may also be a combination of physical and non-physical interfaces.

Metadata for observable physico-chemical quantities may refer to additional information related to the observable physico-chemical quantities (e. g. location of a sensor, time stamp)

The at least one process network operation parameter refers to an operating parameter that is intended to be monitored. This process network operation parameter may be any observable selected physical quantity in the collapsed graph structure or any performance metric that can be derived from these selected observable physico-chemical quantities. The at least one process network operation parameter, may reflect the operation parameter at a specific point in time, this may be the current one, and at a specific point in the process network, e.g. a specific unit operation. The at least one process network operation parameter may be a temperature, a concentration, a total mass flow, or any performance metric derived thereof.

The proposed method provides a fast and reliable way of monitoring a process network with at least two plants which would otherwise not be possible. The provided set of balance equations greatly reduces complexity in generating a suitable model. By specifying quantities of main interest, the model can be reduced to the least complex viable model for observing these quantities. Therefore, computation times are greatly reduced, because only balance equations need to be solved. This leads to a reduced lag time in monitoring. A short lag time is crucial for monitoring and/or controlling a process network with at least two interconnected plants.

Historic data may refer to data from a recent to history meaning enough data to be able to perform a significant stationarity test.

The step of providing a system of balance equations may also comprise providing a collapsed graph structure. By that the system of balance equations can be generated from the current collapsed graph structure. This may be beneficial in an environment, where the collapsed graph structure changes.

Providing the system of balance equations from the collapsed graph may only be performed, when the value of the at least one process network operation parameter cannot be directly be retrieved as an observable from the database. This increases the speed of determining the value of the at least one process network operation parameter, because the value can directly be.

Observables and metadata related to the at least one process network operation parameter are observables and metadata that are needed to determine the value of the at least one process network operation parameter.

The step of retrieving historical data related to observable physico-chemical quantities and metadata related to the at least one process network operation parameter from a database may comprise retrieving time series data.

Determining a value for the at least one process network operation parameter by solving the system of balance equations may be performed by solving the set of balance equations as an optimization problem. Solving the set of balance equations as an optimization problem, comprises minimizing an error that reflects the deviation from zero in a specific balance equation. A set of balance equations may be provided for each conserved quantity. Then an error may be de-fined for each set of balance equations for the respective conserved quantity. The optimization problem is then to minimize all errors off all sets of balance equations.

Solving the set of balance equations as an optimization problem has the advantage that and uncertainties in observable physico-chemical quantities are considered. These uncertain-ties may be results of e.g sensor noise, sensor failures, erroneous meta data. Consequently, the method is more robust.

The method may further comprise performing a stationary test on the observable selected physico-chemical quantities and metadata related to the at least one process network operation parameter from a database.

An algorithm for performing a stationary test on time series data is described by Levente et al. (AIChE Journal, 2018, Vol. 00, No. 00, p 1-12).

The concept of describing the process network in form of balance equations is only applicable when the process network is in a stationary state. Applying a stationary test has the advantage that only stationary states are considered Applying the stationary test hast the further advantage to ensure that the system to be monitored is currently in a stationary state. A signal may be generated, if the stationary test reveals that the current state of the process network is not stationary. This signal may be an alarm signal and may be provided to a plant network control center. The alarm signal may shut down of one plant or trigger shut down of the process network. The stationarity test includes time series analysis based on volatility (typical models from finance) or activity (a custom metric derived from near zero variance test, made scalable by applying hyper log-log algorithm). Additional tests are performed to detect outliers and anomalies based on models derived from the historical data set.

The step of retrieving observables and metadata related to the at least one process network operation parameter may further comprise a step data reconciliation and/or gross error detection. Methods for data reconcialation and/or gross error detection are for example described in Yuan Yuan et al. (AICHE Journal, Vol. 61, No. 10, p. 3232-3248).

Data reconciliation addresses random noise on observable physico-chemical quantities which may be results of fluctuations or noise on the sensor signal that is used to determine or measure the respective observable physico-chemical quantity.

The use of data reconciliation has the advantage that accurate and reliable information about the state of processes network is extracted and a single consistent set of data representing the most probable state of the process network.

The use of gross error detection also has the advantage that accurate and reliable information about the state of processes network is extracted and a single a single consistent set of data rep-resenting the most likely state of the process network.

Gross error detection has the further advantage that gross errors may become apparent and therefore, may be detected. Detection of a gross error may generate a gross error signal.

The gross error signal may be provided to a control center of the process network.

The gross error signal may further trigger generating a converged graph structure.

The gross error signal may directly be the trigger signal

Alternatively, the gross error signal may be provided to a watchdog device which then generates the trigger signal.

The step of performing a consistency check allows. To assess whether the retrieved historical data related to observable physico-chemical quantities and metadata related to the at least one process network operation parameter may be confirmed as consistent.

Consistency is only confirmed, when both physico-chemical quantities are identical. Identical means that they are identical within error margins or when the residual between the respective selected pyhsico-chemical quantities is below a threshold or when the residual be-tween the respective selective quantities only shows random noise. A consistency signal may be generated depending on the result of the consistency check.

The consistency check may be performed by a watchdog device and the consistency signal may be used as the trigger signal which may then be used for triggering generation a converged graph structure.

Alternatively, the consistency check signal may be provided to a watchdog device which then generates the trigger signal.

The trigger signal may be provided by a watchdog device. The watchdog device may monitor the process network for detecting changes in the process network. Upon detection of changes in the process network, generating a converged graph structure may be initiated.

The second aspect is also reflected in the following clauses:

1. A method for monitoring a process network with at least two plants, the method comprising the steps of:
   receiving a request for at least one process network operation parameter, via an input interface
   retrieving via the input inferface a system of balance equations from a collapsed graph structure of the process network, with observable physico-chemical quantities on edges and their relation to the vertices,
   retrieving historical data related to observable physico-chemical quantities and metadata related to the at least one process network operation parameter from a data-base,
   determining a value for the at least one process network operation parameter by solving the system of balance equations based on the historical data and the current data,
   providing via an output interface the value of the for at least one process network operation parameter.

2. The method of clause 1, comprising a step of performing a stationary test.

3. The method of any of the preceding clauses, comprising a step a step of data reconciliation and/or gross error detection.

4. The method of any of the preceding clauses, comprising the step of a consistency check.

5. The method of any of the preceding clauses wherein the at least one process network operating parameter comprises at least two or more process network operation parameters.

6. The method of clause 5, wherein providing via an output interface the values of the at least two or more process network operation parameters 7. The method of any preceding clauses, further performing the step of receiving current data related to observable physico-chemical quantities and metadata related to the at least one process network operation parameter.

8. A system for monitoring a process network with at least two plants, the system comprising:
   an input interface for
      receiving a request for at least one process network operation parameter
      retrieving a system of balance equations from a collapsed graph structure of the process network, with observable physico-chemical quantities on edges and their relation to the vertices,
      retrieving historical data related to observable physico-chemical quantities and metadata related to the at least one process network operation parameter from a database,
   an output interface for
      providing the value of the for at least one process network operation parameter, and
   a processor for performing the method steps according to any of the clauses 1 to 7.

9. Computer program product that when run on a computer performs the method steps of any of the method clauses 1-7.

In a Third aspect a method for controlling a process network with at least two plants is proposed, the method comprising the steps of:
   receiving via an input interface a request for at least, one optimization objective by specifying at least one process parameter to be optimized.
   retrieving via the input interface a system of balance equations from a collapsed graph structure of the process network, with observable physico-chemical quantities on edges and their relation to the vertices, retrieving from a database historical data, the historical data related to observable physico-chemical quantities and metadata related to the at least one process network operation parameter to be optimized, determining a value for the at least one process network operation parameter to be optimized by solving the system of balance equations providing via an output interface the value of the for at least one process network operation parameter.

The system of balance equations from a collapsed graph structure of the process network derived by the method of any of clauses 1 to 7 from the first aspect The step of providing a system of balance equations may also comprise providing a collapsed graph structure. By that the system of balance equations can be generated from the current collapsed graph structure. This may be beneficial in an environment, where the collapsed graph structure frequently changes.

The step of determining a value for the at least one process network operation parameter to be optimized by solving the system of balance equations may be preceded by defining an optimization objective function. The optimization objective function may be a value for the at least one process network operation parameter to be optimized or a deviation of a value for the at least one process network operation parameter to be optimized from a target value.

The step determining a value for the at least one process network operation parameter to be optimized by solving the system of balance equations may then be reduced to solving the system of balance equations from a collapsed graph structure of the process network, with observable physico-chemical quantities on edges and their relation to the vertices by minimizing an objective function and use as a constraint that the balance equations are best fulfilled. Solution for optimization problems are described in Books, (e.g. https://www.springer.com/de/book/9780387303031).

The step of receiving current data related to observable physico-chemical quantities and metadata related to the at least one process network operation parameter to be optimized, enables in process control of the plant network.

Observables and metadata related to the at least one process network operation parameter to be optimized are observables and metadata that are needed to determine a value for the at least one process network operation parameter to be optimized by solving the system of balance equations.

The step of retrieving historical data related to observable physico-chemical quantities and metadata related to the at least one process network operation parameter from a database may comprise retrieving time series data.

Determining a value for the at least one process network operation parameter to be optimized by solving the system of balance equations may be performed by solving the set of balance equa-tions as an optimization problem. Solving the set of balance equations as an optimization prob-lem, comprises minimizing an error that reflects the deviation from zero in a specific balance equation. A set of balance equations may be provided for each conserved quantity. Then an error may be defined for each set of balance equations for the respective conserved quantity. The optimization problem is then to minimize all errors off all sets of balance equations i.e. con-straint violation.

Solving the set of balance equations as an optimization problem has the advantage that and uncertainties in observable physico-chemical quantities can be considered. These uncertainties may be results of e.g sensor noise, sensor failures, erroneous meta data—e.g. wrong unit soft measurement. Consequently, the method is more robust.

The method may further comprise performing a stationary test on the observable selected physico-chemical quantities and metadata related to the at least one process network operation parameter to be optimized from a database.

An algorithm for performing a stationary test on time series data is described by Levente et al. (AIChE Journal, 2018, Vol. 00, No. 00, p 1-12).

The concept of describing the process network in form of balance equations is only applicable when the process network is in a steady state. Applying a stationary test has the advantage that only stationary states are considered. Applying the stationary test has the further advantage to ensure that the system to be monitored is currently in a stationary state. A signal may be generated, if the stationary test reveals that the current state of the process network is not stationary. This signal may be an alarm signal and may be provided to a plant network control center. The alarm signal may shut down of one plant or trigger shut down of the process network.

The stationarity test includes time series analysis based on volatility (typical models from finance) or activity to detect outlier and anomalies based on dynamics in time constants derived from the historical data set.

The step of retrieving observables and metadata related to the the the at least one process network operation parameter to be optimized may further comprise a step data reconciliation and/or gross error detection.

Methods for data reconcialation and/or gross error detection are for example described in Yuan Yuan et al. (AICHE Journal, Vol. 61, No. 10, p. 3232-3248).

Data reconciliation addresses random noise on observable physico-chemical quantities which may be results of fluctuations or noise on the sensor signal that is used to determine or measure the respective observable physico-chemical quantity.

The use of data reconciliation has the advantage that accurate and reliable information about the state of processes network is extracted and a single a single consistent set of data representing the most probable state of the process network.

The use of gross error detection also has the advantage that accurate and reliable information about the state of processes network is extracted and a single a single consistent set of data rep-resenting the most probable state of the process network.

Gross error detection has the further advantage that gross errors may become apparent and therefore, may be detected. Detection of a gross error may generate a gross error signal.

The gross error signal may be provided to a control center of the process network.

The gross error signal may further trigger generating a converged graph structure.

The gross error signal may directly be the trigger signal

Alternatively, the gross error signal may be provided to a watchdog device which then generates the trigger signal.

The step of performing a consistency check allows. To access if the provided whether the retrieved historical data related to observable physico-chemical quantities and metadata related to the at least one process network operation parameter may be confirmed as consistent.

Consistency is only confirmed, when measured and determined physico-chemical quantities are identical. Identical means that they are identical within error margins or when the residual between the respective selected pyhsico-chemical quantities is below a threshold or when the residual between the respective selective quantities only shows random noise. A con-sistency signal may be generated depending on the result of the consistency check.

The consistency check may be performed by a watchdog device and the consistency signal may be used as the trigger signal which may then be used for triggering generation a converged graph structure.

Alternatively, the consistency check signal may be pro-vided to a watchdog device which then generates the trigger signal.

The trigger signal may be provided by a watchdog device. The watchdog device may monitor the process network for detecting changes in the process network. Upon detection of changes in the process network, generating a converged graph structure may be initiated.

The process parameter to be optimized may include plant output, energy consumption, CO2 emission.

The step of specifying a further constraining objective for the system of balance equations has the advantage that further available information can be used in the optimization problem. Adding additional information will increase the reliability.

When the further constraining objective for the system of balance equations comprises a model of at least one plant of the plant network, this has an additional advantage.

Determining optimized operating parameters for the opti-mization objective from the retrieved observables by solving the system of balance equations under evaluation of the constraint may further comprise a further constraint pro-vided by a data driven model or a hybrid model. The data driven model may be generated according to the method of the fourth aspect.

The process network may limited by physical limitations. By adding further constraining objective for the system of balance equations relates to physical limitations of the process, this can be reflected in the optimization step. Physical limitations of the process network may include feed capacity, storage capacity, cooling capacity, safety con-straints.

The at least one optimization objective by specifying at least one process parameter to be optimized may comprise least two or more process parameters to be optimized.

The third aspect is also reflected in the following clauses:

1. A method for controlling a process network with at least two plants, the method comprising the steps of:
   receiving via an input interface a request for at least one optimization objective by specifying at least one process parameter to be optimized,
   retrieving via the input interface a system of balance equations from a collapsed graph structure of the process network, with observable physico-chemical quantities on edges and their relation to the vertices,
   retrieving from a database historical data, the historical data related to observable physico-chemical quanti-ties and metadata related to the at least one process network operation parameter to be optimized,
   determining a value for the at least one process network operation parameter to be optimized by solving the system of balance equations
   providing via an output interface the value of the for at least one process network operation parameter to be optimized.
2. The method of clause 1, further comprising the step of receiving current data related to observable physico-chemical quantities and metadata related to the at least one process network operation parameter to be opti-mized.
3. The method of any of the preceding clauses, wherein retrieving observables and metadata if followed by a step of performing a stationary test.
4. The method of any of the preceding clauses, wherein retrieving observables and metadata comprises a step of data reconciliation and/or gross error detection.
5. The method of any of the preceding clauses, wherein the method further comprises the step of specifying a further constraining objective for the system of balance equations.
6. The method of any of the preceding clauses, wherein the further constraining objective for the system of balance equations comprises a model of at least one plant of the plant network.
7. The method of clause 6, wherein the model of the at least one plant of the plant network comprises a data driven model or a hybrid model based on a data driven model and a rigorous model
8. The method of clause 7, wherein the model relates the input of a plant or process network to the output of a plant or the process network
9. The method of clause 5, wherein the further constrain-ing objective for the system of balance equations relates to physical limitations of the process.
10. The method of any of the preceding clauses wherein the at least one optimization objective by specifying at least one process parameter to be optimized comprises at least two or more process parameters to be opti-mized.
11. A system for controlling a process network with at least two plants, the system comprising:
    an input interface for
    receiving a request for at least one optimization objective by specifying at least one process parameter to be optimized and
    retrieving a system of balance equations from a collapsed graph structure of the process network, with observable physico-chemical quantities on edges and their relation to the vertices
    an output interface for
    providing the value of the for at least one process network operation parameter to be optimized
    a processor configured to
    perform the method steps according to any of the clauses 1-10.
12. Computer program product that when run on a com-puter performs the method steps of any of the method clauses 1-10.

In a fourth aspect a method for generating a hybrid model to monitor and/or control a process network with at least two plants connected to each other is proposed, the method comprising the steps of:
   providing a system of balance equations from a collapsed graph structure of the process network, with observable physico-chemical quantities on edges and their relation to the vertices,
   receiving via an input interface at least one objective specifying at least one process parameter dependency to be trained
   retrieving via an input interface historical data of the process network with at least two plants connected to each other,
   training of a hybrid model, including the system of balance equations and a data-driven model based on the historical data and on the least one objective specifying at least one process parameter dependency to be trained, providing the trained hybrid model via an output interface.

The system of balance equations from a collapsed graph structure of the process network derived by the method of any of clauses 1 to 7 from the first aspect Retrieving historical data of the process network with at least two plants connected to each other may comprise retrieving only historical data related to the least one objective specifying at least one process parameter dependency to be trained. This leads to a reduced data set, compared to the full set of historical data. This reduces the time of retrieving data, as only a subset of the available data is retrieved. This in turn leads to a faster training process.

In production process environment it is difficult to provide large data sets that allow reliable train-ing of data driven models. The size of a required data set increases, with the number of depend-encies that is to be learned. The step of receiving via an input interface at least one objective speci-fying at least one process parameter dependency to be trained addresses that issue. By receiving least one objective specifying at least one process parameter dependency to be trained, the scope of the training process is limited, thus it is possible to work with a reduced set of training data and therefore train the hybrid model faster.

One way of retrieving of determining the relevant data would be to start with the collapsed graph structure that fully describes the system with all observables. In a next step measured signals may be removed. In a next step all selected physical quantities may be labeled. This may be repeated as long as all of the physico-chemical quantity remain observ-able. By this the smallest data set required for training the hybrid model according to the at least one objective speci-fying at least one process parameter dependency to be trained.

For machine learning historical data needs to be provided. This data may be retrieved from data bases. Data for each plant may be stored separately in a corresponding data base for each plant. Alternatively, data for all plants may be stored in an enterprise database, which may be provided as a cloud service.

Historical data may comprise time series for measured values and/or observables. Generally, the historical data comprise various states of the production plant or the network of production plants. These states may comprise amongst other things, a steady-state, a start-up state, a shut-down state and an error state.

The method may further comprise the step of performing a stationary test on the observable physico-chemical quan-tities and metadata related to the at least one process network operation parameter from a database.

The concept of describing the process network in form of balance equations is only applicable when the process network is in a stationary state. Applying a stationary test to the historical data has the advantage that only stationary states are considered.

An algorithm for performing a stationary test on time series data is described by Levente et al. (AIChE Journal, 2018, Vol. 00, No. 00, p 1-12) disclose a statistical frame-work to systematically determine mean stationary in the context of continuous manufacturing processes.

For monitoring and or controlling a plant or a plant network, the steady state is of major interest. Consequently, the time series data related to a steady state of the production process needs to be determined.

This may be done by stationary or event analysis. Sta-tionary data are related to a steady state of a production process This allows to inspect the time series data and classify data in stationary and non-stationary, the non-stationary data may relate to ramp-up states, ramp down states, on/off states or error states and be labeled accord-ingly. Specifically, several segments of a process may be analyzed independently, and labels aggregated to plant level. As one part of the process may in fact be stationary, while other are not. Depending on the targeted least one process network operation parameter, constraints on stationarity may be relaxed for certain parts of the process. The time series data will then be separated according to their label. The data sets for each label may then be further separated into respective training and test data sets.

Since the balance equations require a stationary system only stationary data points are useful. Here all those data clusters which were recorded under stationary operating conditions are filtered. Any anomalies shut down periods or other non-stationary segments in the data set are removed. The stationarity test may include time series analysis based on volatility (typical models from finance) or activity to detect outlier and anomalies based on dynamics in time constants derived from the historical data set. Such station-arity analysis allows to reduce the historical data set to such data that represents normal operating conditions in the process network. This restricts the historical data to station-ary and/ or cyclic stationary operating conditions.

Following the stationarity test the historical data set may be further enhanced by data validation and data reconcilia-tion. This further consolidates the historical data set. Finally only the consolidated historical data set may be used for training the hybrid model.

Preparing the historical data in such a way provides a clean data set reflecting true process con-ditions in the process network. Any effects of non-stationary operating conditions, gross errors or random errors are reduced. As a result, any hybrid model trained based on such clean data will not be affected by such effects.

Providing the trained hybrid model may comprise pro-viding a rigorous model based on pyhsico-chemical laws and providing a data driven model based on historical data.

The major advantages of combining a flexible model from a graph structure data base with a data driven model into a hybrid model:

that the flexible graph structure allows an adaption of the rigorous model to the current state of the process network, including accounting for errors, while main-taining the trained model. Consequently, retraining of the model remains vastly unnecessary even in case of errors in the process network.

since the rigorous model is not able to take environmental such as seasonal effects into account, the data driven part adds accuracy to the rigorous model and thus correcting any deficiencies depending on the input/output structure of the hybrid model, the graph data base and the extracted model may be used to calculated missing data points on the input part of the hybrid model the modelling approach is further scalable and may be extended from multiple plants via full Verbund or plant complexes to value chains once the hybrid model is generated it allows to closely control a full process network e.g. on a daily basis dependencies between components of the process network can easily be captured via the base graph structure allowing for more accurate prediction.

The use of the hybrid model is to provide recommendation on how to operate the process network. For example, the hybrid model may provide recommendations on plant flows for specific objective. From such flows concrete operating parameters on plant level may be determined. Additionally, the hybrid model may be used to detect anomalies based on real-time sensor data. In such a case the output of the hybrid model may be compared to real-time sensor data. In case of significant differences, a notification or alarm may be triggered in the affected plants or may be used for root cause analytics.

Conversely any differences detected between the hybrid model output and the real-time sensor data over time may provide indications on model drift. If such drift is detected, the model may be re-trained based on more recent historical data or elements of the base graph structure are updated to built a new rigorous model considering such changes.

The following description relates to the system, the method, the computer program, the computer readable storage medium lined out above. In particular the systems, the computer programs and the computer readable storage media are configured to perform the method steps as set out above and further described below.

In the context of the present invention a plant may refer any facility in which a particular product is made or power is produced.

In the context of the present invention chemical plant refers to any manufacturing facility based on chemical processes, e.g. transforming a feedstock to a product using chemical processes. In contrast to discrete manufacturing, chemical manufacturing is based on continuous or batch processes. As such monitoring and/or controlling of chemical plants is time dependent and hence based on large time series data sets. A chemical plant may include more than 1.000 sensors producing measurement data points every couple of seconds. Such dimensions result in multiple terabytes of data to be handled in a system for controlling and/or monitoring chemical plants. A small-scale chemical plant may include a couple of thousand sensors producing data points every 1 to 10 s. For comparison a large-scale chemical plant may include a couple of ten-thousand sensors, e.g. 10.000 to 30.000, producing data points every 1 to 10 s. Contextualizing such data results in the handling of multiple hundred gigabytes to multiple terabytes.

Chemical plants may produce a product via one or more chemical processes transforming the feedstock via one or more intermediate products to the product. Preferably a chemical plant provides an encapsulated facility producing a product, that may be used as feedstock for the next steps in the value chain. Chemical plants may be large-scale plants like oil and gas facilities, gas cleaning plants, carbon dioxide capture facilities, liquefied natural gas (LNG) plants, oil refin-eries, petro-chemical facilities or chemical facilities. Upstream chemical plants in petro-chemicals process production for example include a steamcracker starting with naphtha being processed to ethylene and propylene. These upstream products may then be provided to further chemical plants to derive downstream products such as polyethylene or polypropylene, which may again serve as feedstock for chemical plants deriving further downstream products. Chemical plants may be used to manufacture discrete products. In one example one chemical plant may be used to manufacture precursors for polyurethane foam. Such precursors may be provided to a second chemical plant for the manufacture of discrete products, such as an isolation plate comprising polyurethane foam.

The value chain production via various intermediate products to an end product can be decentralized in various locations or integrated in a Verbund site or a chemical park. Such Verbund sites or chemical parks comprise a network of interconnected chemical plants, where products manufactured in one plant can serve as a feedstock for another plant.

Chemical plants may include multiple assets, such as heat exchangers, reactors, pumps, pipes, distillation or absorption columns to name a few of them. In chemical plants some assets may be critical. Critical assets are those, which when disrupted critically impact plant operation. This can lead to manufacturing processes being compromised. Reduced product quality or even manufacturing stops may the result. In the worst-case scenario fire, explosion or toxic gas release may be the result of such disruption. Hence such critical assets may require more rigorous monitoring and/or controlling then other assets depending on the chemical processes and the chemicals involved. To monitor and/or control chemical processes and assets multiple actors and sensors may be embedded in the chemical plant. Such actors or sensors may provide process or asset specific data relating to e.g. the state of an individual asset, the state of an individual actor, the composition of a chemical, or the state of a chemical process. In particular, process or asset specific data include one or more of the following data categories:

process operation data, such as composition of a feedstock or an intermediate product, process monitoring data, such as flow, material temperature, asset operation data, such as current, voltage, and asset monitoring data, such as asset temperature, asset pressure, vibrations.

The fourth aspect is also reflected in the following clauses:

1. A method for generating a hybrid model to monitor and/or control a process network with at least two plants connected to each other, the method comprising the steps of:

providing a system of balance equations from a collapsed graph structure of the process network, with observable physico-chemical quantities on edges and their relation to the vertices, receiving via an input interface at least one objective specifying at least one process parameter dependency to be trained retrieving via an input interface historical data of the process network with at least two plants connected to each other, training of a hybrid model, including the system of balance equations and a data-driven model based on the historical data and on the least one objective specifying at least one process parameter dependency to be trained, providing the trained hybrid model via an output interface 2. The method of clause 1, comprising a further step of performing a stationary test on the historical data of the process network.

3. The method according to any of the preceding clauses , comprising a further step of data reconciliation and/or gross error detection.

4. The method of any of the preceding clauses, wherein the hybrid model further comprises a rigorous model, reflecting physico chemical laws.

5. A system for generating a hybrid model to monitor and/or control a process network with at least two plants connected to each other, comprising an input interface for receiving one objective specify-
ing at least one process parameter dependency to be
trained an output interface for providing the trained hybrid
model a processor configured to perform
the method of any of clauses 1-4.

6. A computer program product, that when run on a
computer performs the method of any of clauses 1-4.

The disclosure applies to the systems, methods, computer
programs, computer readable non-transitory media, com-
puter program products disclosed herein alike. Therefore, no
differentiation is made between systems, methods, computer
programs, computer readable non-volatile storage media or
computer program products. All features are disclosed in
connection with the systems, methods, computer programs,
computer readable non-transitory storage media, and com-
puter program products disclosed herein.

DETAILED DESCRIPTION

FIG. 1 shows a process network of two plants, with a first
plant A 10 and a second Plant B 20, the two plants are
interconnected by a product transportation system 30.

Figure 2:
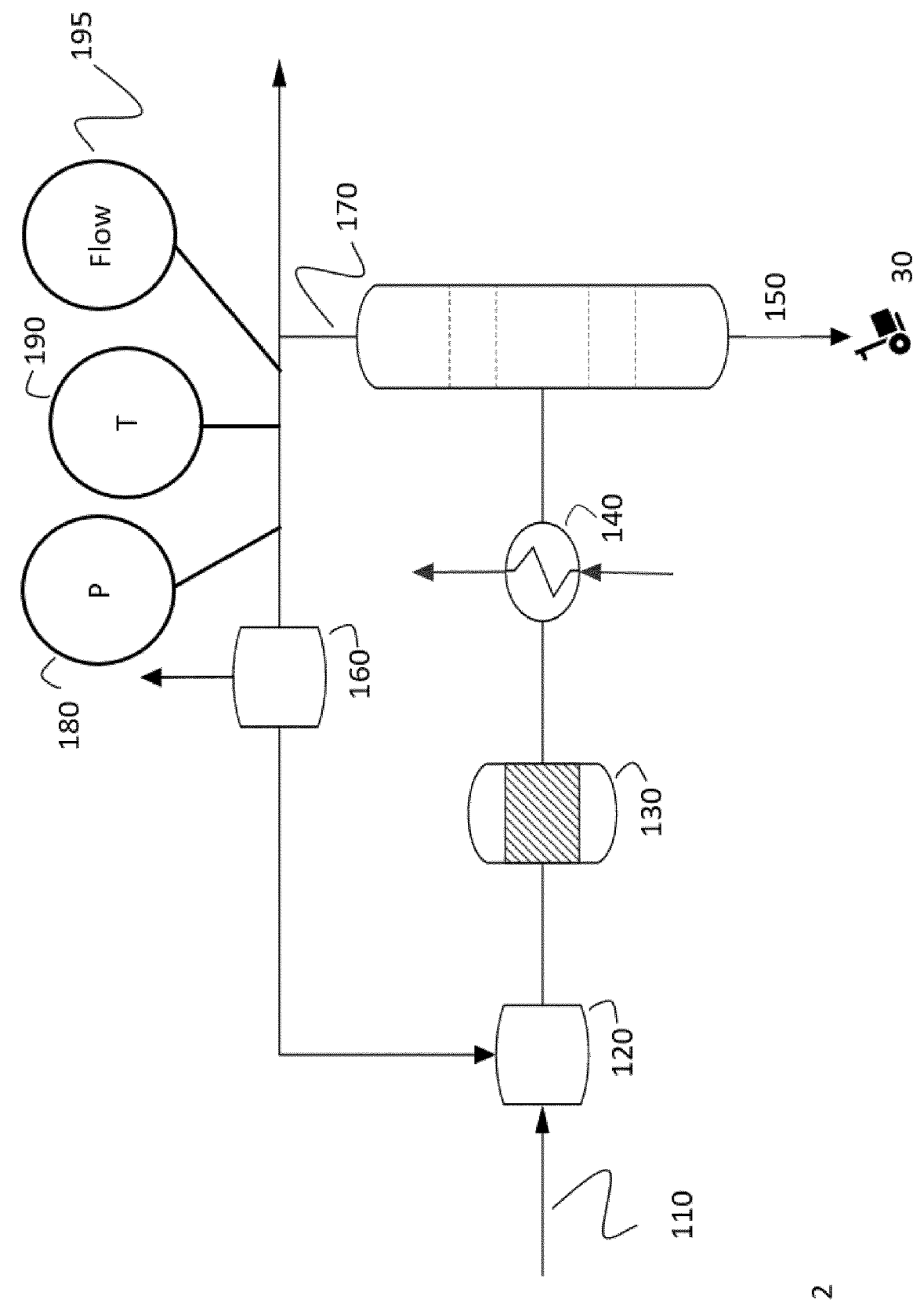

A simplified flow chart of plant A 10 is shown in FIG. 2.
This simple flow chart is a digital process representation of
the first plant A.

In this case the plant is a simplified ammonia production
plant 100. A product supply 110 provides educts to a mixer
120, a pipe system 130 then transports a stream of mixed
educts to a reactor 140, where a reaction takes place. Heat
exchanger 140 liquifies a reaction product prior to separa-
tion. After the reaction Amonia is separated from residuals,
in a separator 150. The product is provided to a transporta-
tion system 30 via product pipe 150. The residual is provided
to a splitter via residual pipe 170, which provides a portion
of the residual back to the mixer and another part of the
residual is provided to a further location. In this example a
temperature sensor 180, a pressure sensor 190 and a volume
flow sensor 195 are provided on residual pipe 170.

Figure 3:
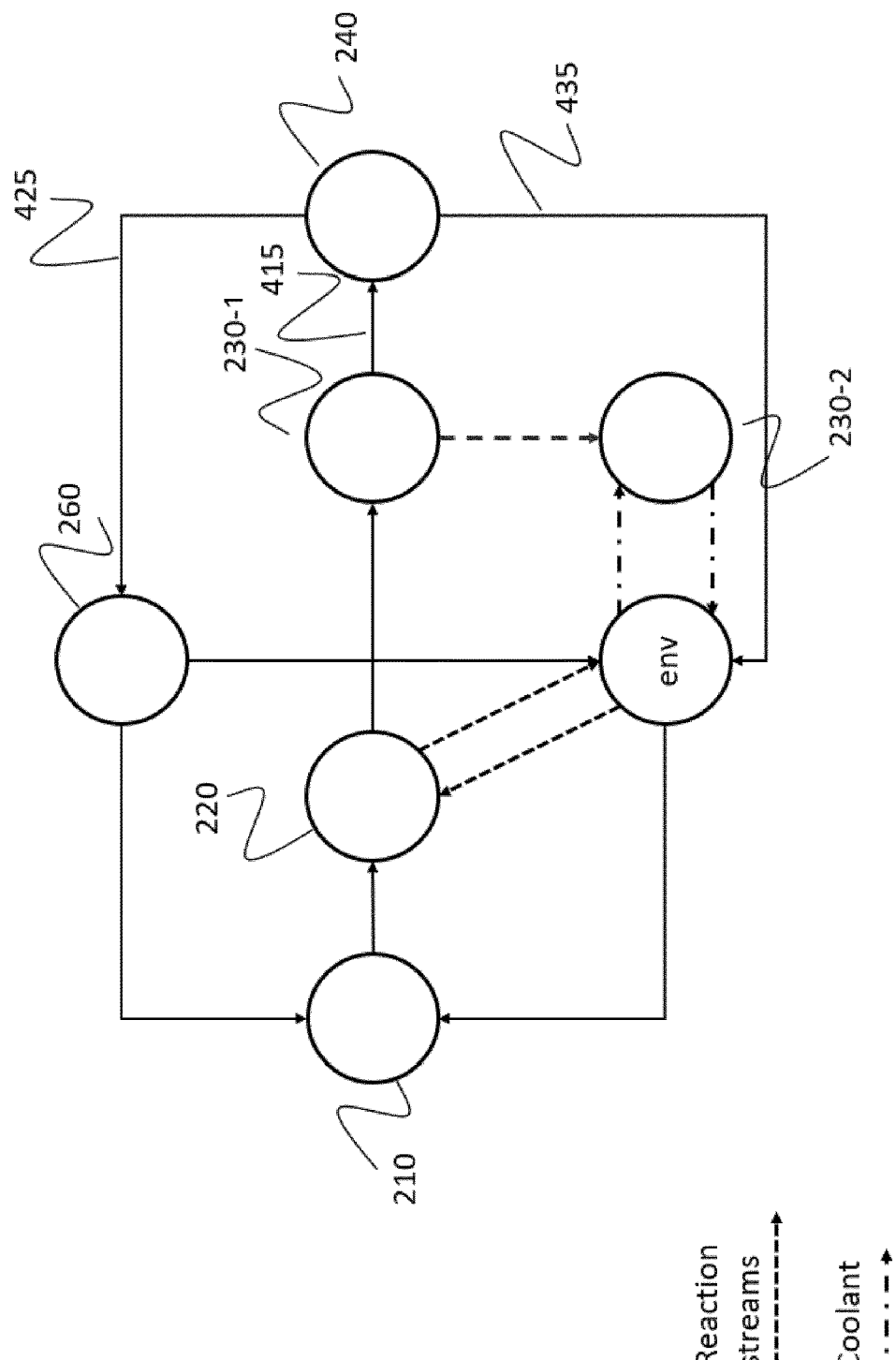

FIG. 3 shows a graph structure 200 of the first plant. Each
vertex 2xx in this graph structure represent a unit operation.
Vertex 210 represents unit operation of the mixer, Vertex 220
represents unit operation unit operation of the reactor, vertex
320 represents unit operation unit operation of the heat
exchanger, vertex 240 represents unit operation unit opera-
tion of the separator and vertex 250 represents unit operation
unit operation of the splitter. An additional vertex 260—the
environment vertex—is added to the graph structure. This
vertex serves as a sink and as a source and secures that the
graph structure represents a self-contained system. Describ-
ing a plant as a self-contained system has the advantage that
the conservation rules of physics apply.

Edges link vertices. The edges represent at least physico-
chemical quantities and metadata rep-resenting at least
physico-chemical quantities and a measurable tag.

In case of the edges 415, 425, 435 around unit vertex 240.
These physico-chemical quantities-physico-chemical quan-
tities comprise that the total massflow going into vertex 240
which is represented as a selected physcico-chemical quan-
tity on edge 415 is equal to the sum of mass flows repre-
sented by edges 425 and 435 going out of vertex 240.

The edges 415, 425, 435 also include meta data repre-
senting at least selected physical quantities.

One physico-chemical quantity represented in the meta
data of edge 415 is the total massflow into unit operation
240. One physico-chemical quantity represented in the meta data of 435 is the mass of NH3 going out of unit operation
240. One physico-chemical quantity represented in the meta
data of edge 425 is the mass of the combined residual in this
example N2 and H2. Further physico-chemical quantities
included in represented in the meta data of edge 425 are
values from the temperature sensor, the pressure sensor 190
and the flow sensor 195, namely pressure P, temperature T
and volume flow F of the residual.

The meta data also include a measurable tag. On edge 425
P, T and F will be tagged measurable.

A further physico-chemical relation that is represented by
the edge 425 is the relation that the massflow for the residual
can be determined from P, T and F.

Under this condition only one of the massflows repre-
sented by edge 415 and edge 435 have to be measured to
determine the other.

By evaluating all physico-chemical quantities and all
physico-chemical quantitiesphysico-chemical quantities
using the meta data on edges we can generate a new graph.
An example of such a new graph struc-ture is shown in FIG.
4a.

300 represents a graph with vertices 310-350. In this
example one physico-chemical quantity (assume total mass-
flow) on all edges is measured and/or determined using
physico-chemical quantitiesphysico-chemical quantities.

This means that this physico-chemical quantities are
observable.

Figure 4:
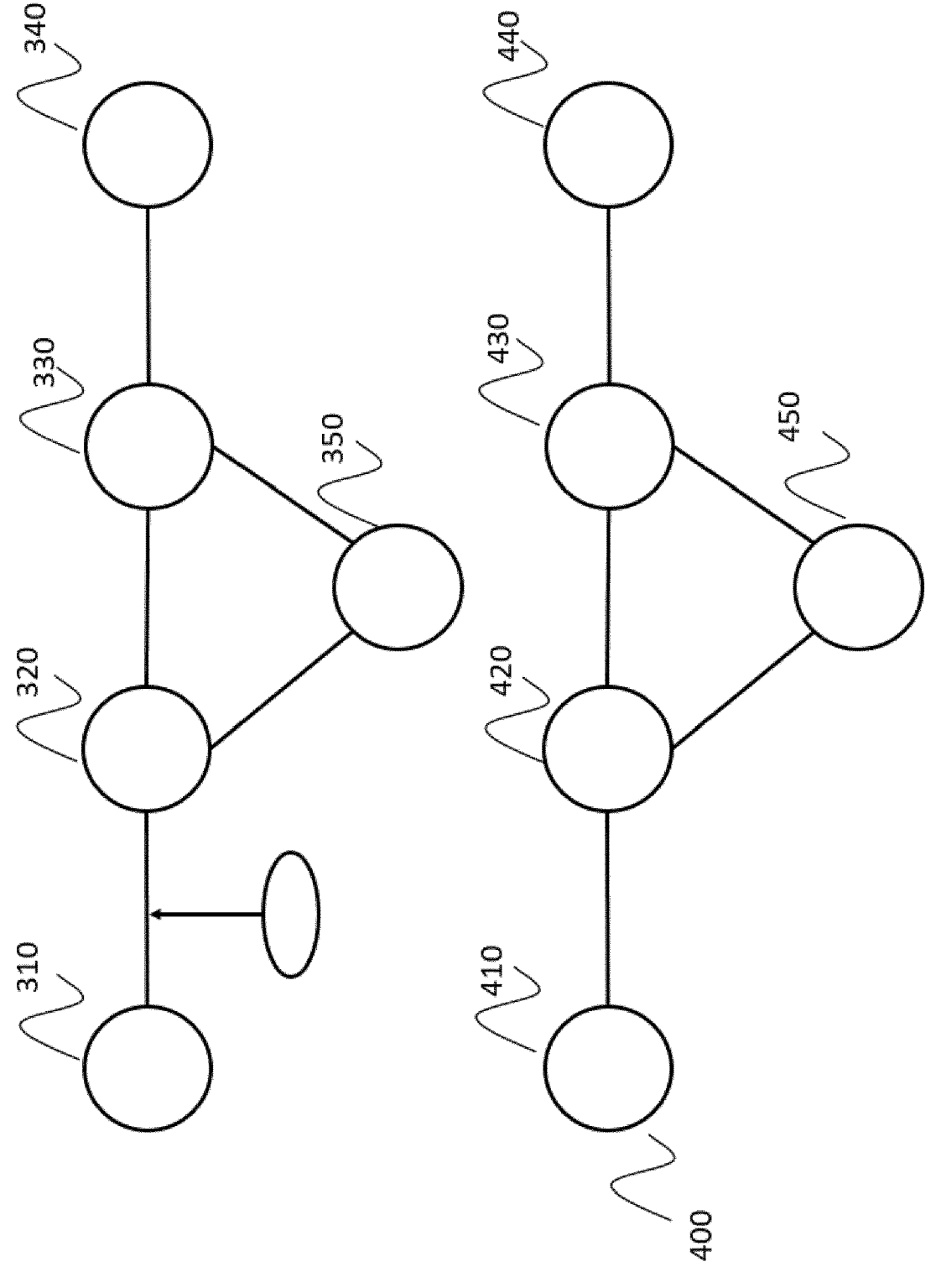

The generated collapsed graph structure 400 does not
change as can be seen in FIG. 4b.

Figure 5:
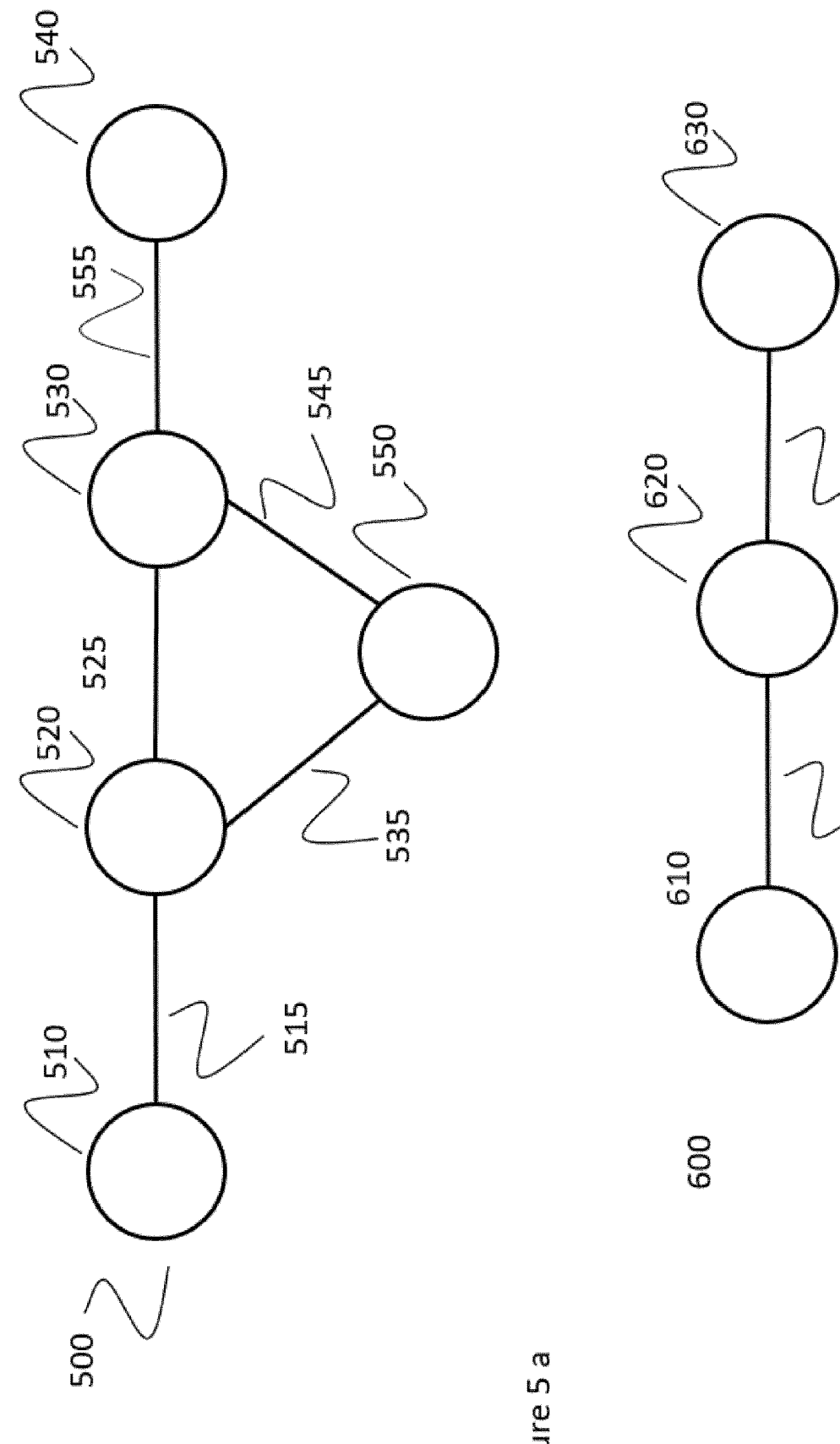

FIGS. 5a and 5b show an alternative graph structure the
graph structure where one physico-chemical quantity is only
measured and/or determined on edges 515, 555 and remains
unknown on edges 525, 535, 545, then a collapsed graph
structure 600 is generated, which only contains edges, where
the physico-chemical quantity is observable.

Dependent on the physico-chemical quantity starting
from an identical graph structure 400 and 500, the collapsed
graph structure may be different. Hence, a collapsed graph
for each physico-chemical quantity is generated.

Figure 6:
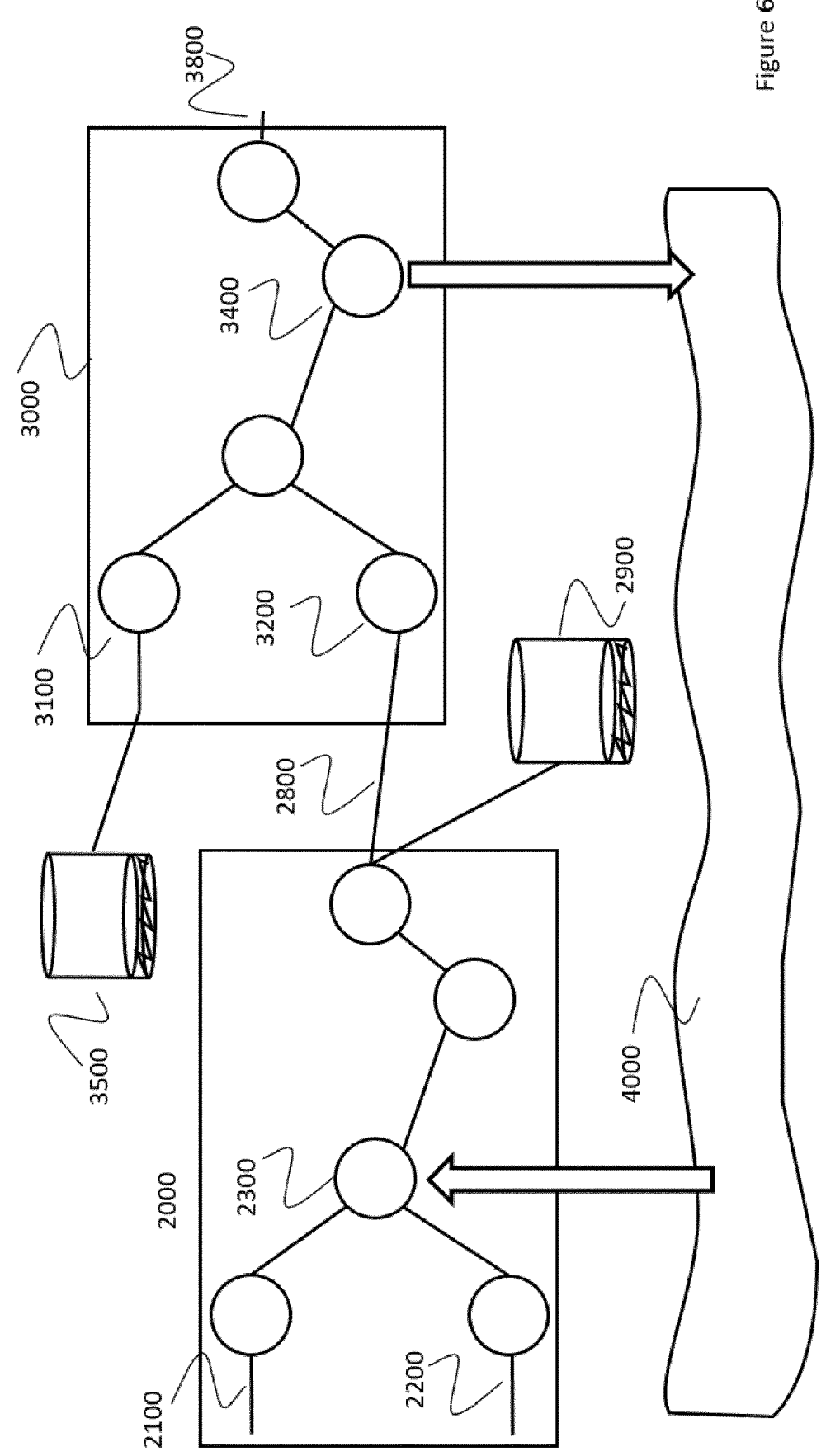

FIG. 6 shows a network of to plants, each plant is shown
as a graph structure 2000, 3000. Feeds for the first plant are
shown as 2100, 2200. A river 4000 serves as a water supply
for cool-ing. Cooling water is provided to the vertex 2300
representing a unit operation. A product 2900 is generated in
the first plant. Waste 2800 is also generated in the first plant.
The waste of the first plant serves as a feed for the second
plant. The waste is provided to the vertex 3200, a second
feed 3500 is provided to the second plant. The second plant
provides an output product at 3800. The distribution of
product 2900 to waste 2800 may be dependent on various
process parame-ters, which in turn influences the product
output at 3800. In this example the process parameter to be
trained relates to mass flow at output 3800. Massflow at
output 3800 is a function of tem-perature of the water of the
river. In general this is not a relation that can be solved by
a rigorous model. In this case, a hybrid model may be
trained, based in historical data of the first plant.

Figure 7:
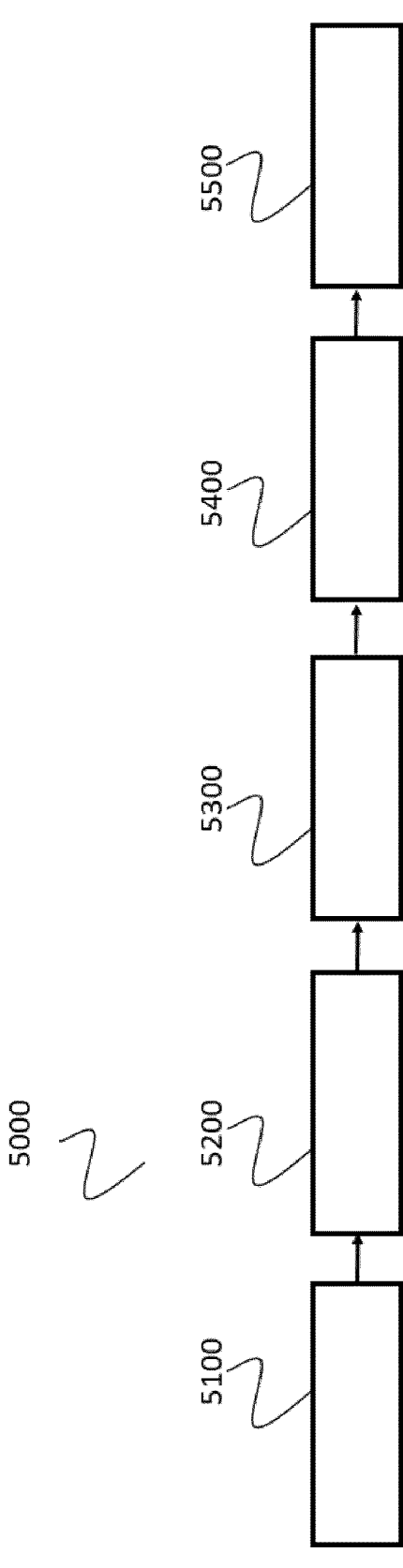

FIG. 7 shows depicts the method 5000 of the first aspect.

At first method step 5100, a first digital representation of
the process network including a digital process representa-
tion of each plant, its connections to other plants and sensor
elements placed in the process network, is provided. The
digital process representation of each plant may be accord-
ing to FIG. 2.

At step 5200 a graph structure is generated based on the first digital representation. The graph structure including vertices representing unit operations, edges linking unit operations representing conserved quantities, wherein the edg-es include edge meta data representing physico chemical quantities, and a measurable tag At step 5300 a collapsed graph structure including, vertices representing virtual unit operations, edges linking virtual unit operations representing at least physico-chemical relations, wherein the edges include edge meta data representing observable physico chemical quantities, and their relation to vertices, is generated generating based on the graph structure generated at step 5200.

At step 5400 a set of balance equations from the collapsed graph structure is derived.

At step 5500 the set of balance equations, and physico-chemical quantities physico-chemical quantities for monitoring and/or controlling operation of a process network is provided.

Figure 8:
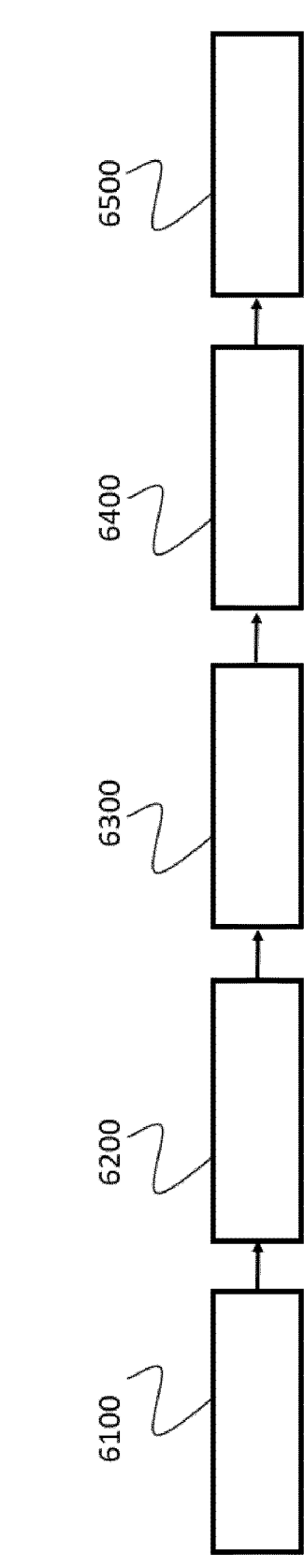

FIG. 8 shows the method 6000 of the second aspect.

At step 6100 a request for at least one process network operation parameter, via an input interface is received At step 6200 a set of balance equations, and physico-chemical quantities physico-chemical quantities a collapsed graph struc-ture is retrieved via the input inferface At Step 6300 historical data related to observable physico-chemical quantities and metadata related to the at least one process network operation parameter are retrieved from a database, At step 6400 a value for the at least one process network operation parameter by solving the system of balance equations based on the historical data and the current data, is determined At step 6500 the value of the for at least one process network operation parameter is provided via an output interface.

Figure 9:
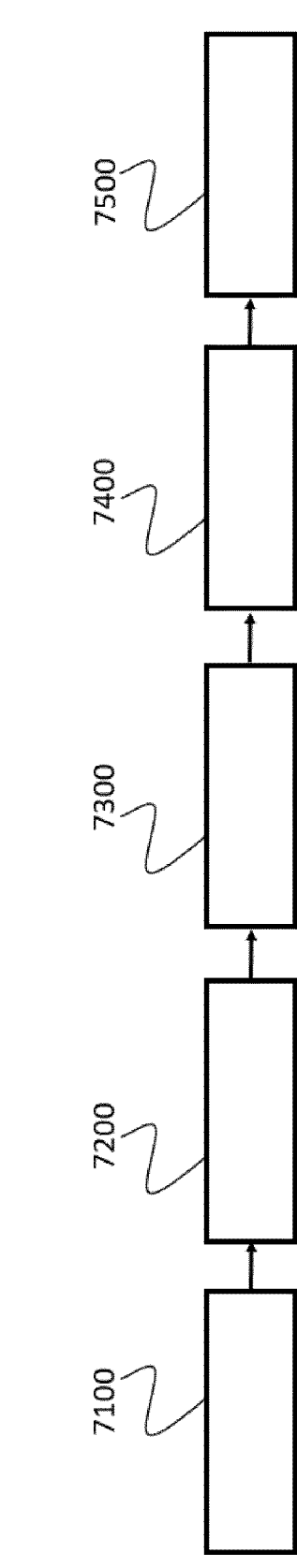

FIG. 9 shows the method 7000 of the third aspect.

At step 7100 a request for at least one optimization objective by specifying at least one process parameter to be optimized, is received via an input interface.

At step 7200 a set of balance equations, and physico-chemical quantities physico-chemical quantities a collapsed graph struc-ture, is received via an input interface.

At Step 7300 historical data, the historical data related to observable physico-chemical quantities and metadata related to the at least one process network operation parameter to be optimized, are retrieved from a database.

At step 7400 a value for the at least one process network operation parameter to be optimized by solving the system of balance equations is determining At step 7500 the value of the for at least one process network operation parameter to be optimized is provided via an output interface.

Figure 10:
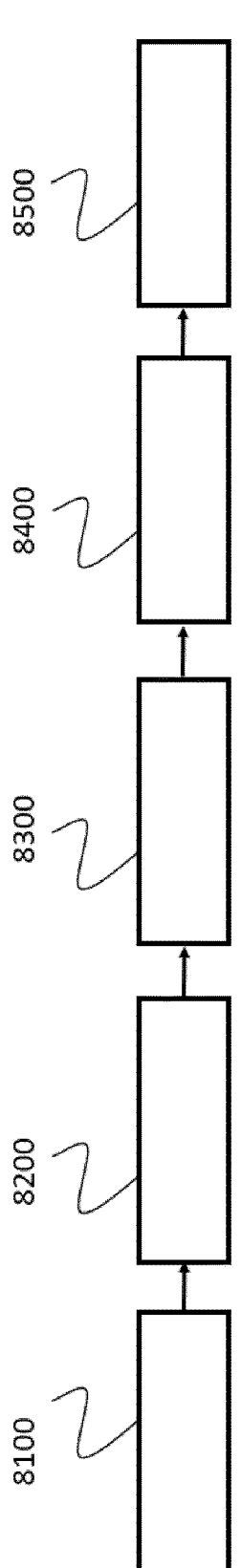

FIG. 10 shows the method 8000 of the fourth aspect.

At step 8100 a set of balance equations, and physico-chemical quantities a collapsed graph structure, is received via the input inferface.

At step 8200 at least one objective specifying at least one process parameter dependency to be trained is received via an input interface.

At step 8300 historical data of the process network with at least two plants connected to each other, are retrieved via an input interface At step 8400 training of a hybrid model, including the system of balance equations and a data-driven model based on the historical data and on the least one objective specifying at least one process parameter dependency to be trained, is performed At step 8500 the trained hybrid model is provided via an output interface.

The invention claimed is:

1. A computer implemented method for generating a model representation of a process network with at least two interconnected chemical plants to enable controlling or monitoring the process network, the method comprising:

providing a digital representation of the process network comprising a digital process representation of each plant, its connections to other plants realized by mass or energy flow and sensor elements placed in the process network, generating, based on a first digital representation, a graph structure including vertices representing unit operations, edges representing physico chemical quantities, wherein the physico chemical quantities comprise mass, energy and component flows, the edges linking the vertices, wherein the edges include a measurable tag for each of the represented physico chemical quantities, the measurable tag indicating if the physico chemical quantity may be measured in the process network, or if the physico chemical quantity may not be measured;

categorizing the physico chemical quantities that may be measured in the process network as observable physico chemical quantities, categorizing physico chemical quantities that may be calculated from balance equations around vertices as observable physico chemical quantities, generating based on the graph structure a collapsed graph structure by collapsing the edges with physico chemical quantities that are not categorized as observable into collapsed vertices, wherein the collapsed graph structure comprises:

collapsed vertices representing virtual unit operations, vertices representing unit operations edges representing only observable physico chemical quantities, linking collapsed vertices and/or vertices, deriving a set of balance equations for each mass, energy or component flow around each vertex, wherein the set of balance equations modeling the process network and are usable for monitoring, controlling, production planning, or prediction models, and providing the set of balance equations to a control device, a monitoring device, a production planner device, or a prediction model generator, and performing a stationary test on the observable selected physico chemical quantities to generate a signal if the stationary test reveals that a current state of the process network is not stationary, wherein the signal shuts down a chemical plant or process network.

2. The method according to claim 1, wherein the vertices representing unit operations further represent vertex meta data comprising physical quantities linked to the respective unit operation.

3. The method according to claim 1, wherein generating a collapsed graph structure comprises generating a collapsed graph for each physico chemical quantity.

4. The method according to claim 3, wherein a set of balance equations is derived from the collapsed graph structure and comprises a set of balance equations for each conserved quantity, wherein the conserved quantity is a quantity following a conservation law.

5. The method according to claim 1, wherein the collapsing edges comprises selecting at least two vertices that are connected via edges collapsing edges between the at least two vertices, thereby creating a virtual vertex.

6. The method according to claim 1, wherein the generating based on the first digital representation of the graph structure further comprises generating a converged graph structure by attributing labels to all physico chemical quantities dependent on whether they are measured physico-chemical quantities, determined physico chemical quantities, measured and determined physico chemical quantities, or physico chemical quantities that are neither measured physico chemical quantities nor determined physico chemical quantities.

7. The method according to claim 6, further comprising receiving a trigger signal, and wherein the generation of the converged graph structure is initiated upon evaluation of the trigger signal indicating that a physico chemical quantity may no longer be measured.

8. A system for generating a problem specific representation of a process network to enable controlling or monitoring a process network with at least two interconnected chemical plants, the system comprising a processor configured for performing the method according to claim 1, an output interface configured for providing the set of balance equations for monitoring and/or controlling operation of a process network.

9. A non-transistory computer readable medium that when run on a computer performs the method of claim 1.

10. A method for monitoring a process network with at least two plants, the method comprising:

receiving a request for at least one process network operation parameter, via an input interface retrieving via the input interface a set of balance equations, wherein the set of balance equations is derived by the method of claim 1, retrieving historical data related to observable physico chemical quantities and metadata related to the at least one process network operation parameter from a database, receiving current data related to observable physico-chemical quantities and metadata for observable physico-chemical quantities, determining a value for the at least one process network operation parameter by solving the system of balance equations based on the historical data and the current data, providing via an output interface the value of the at least one process network operation parameter, and performing a stationary test on observable selected physico chemical quantities to generate a signal if the stationary test reveals that a current state of the process network is not stationary, wherein the signal shuts down a chemical plant or process network.

11. A method for controlling a process network with at least two plants, the method comprising:

receiving via an input interface a request for at least one optimization objective by specifying at least one process parameter to be optimized, retrieving via the input interface a set of balance equations, wherein the set of balance equations is derived according to the method of claim 1, retrieving from a database historical data, the historical data related to observable physico chemical quantities and metadata related to the at least one process network operation parameter to be optimized, determining a value for the at least one process network operation parameter to be optimized by solving the system of balance equations providing via an output interface the value of the at least one process network operation parameter to be optimized, and performing a stationary test on observable selected physico chemical quantities to generate a signal if the stationary test reveals that a current state of the process network is not stationary, wherein the signal shuts down a chemical plant or process network.

12. A method for generating a hybrid model to monitor and/or control a process network with at least two plants connected to each other, the method comprising:

retrieving via the input interface a set of balance equations, wherein the set of balance equations is derived according to the method of claim 1, receiving via an input interface at least one objective specifying at least one process parameter dependency to be trained retrieving via an input interface historical data of the process network with at least two plants connected to each other, training of a hybrid model, including the system of balance equations and a data-driven model based on the historical data and on the least one objective specifying at least one process parameter dependency to be trained, providing the trained hybrid model via an output interface, and performing a stationary test on observable selected physico chemical quantities to generate a signal if the stationary test reveals that a current state of the process network is not stationary, wherein the signal shuts down a chemical plant or process network.

* * * * *